3,164,754

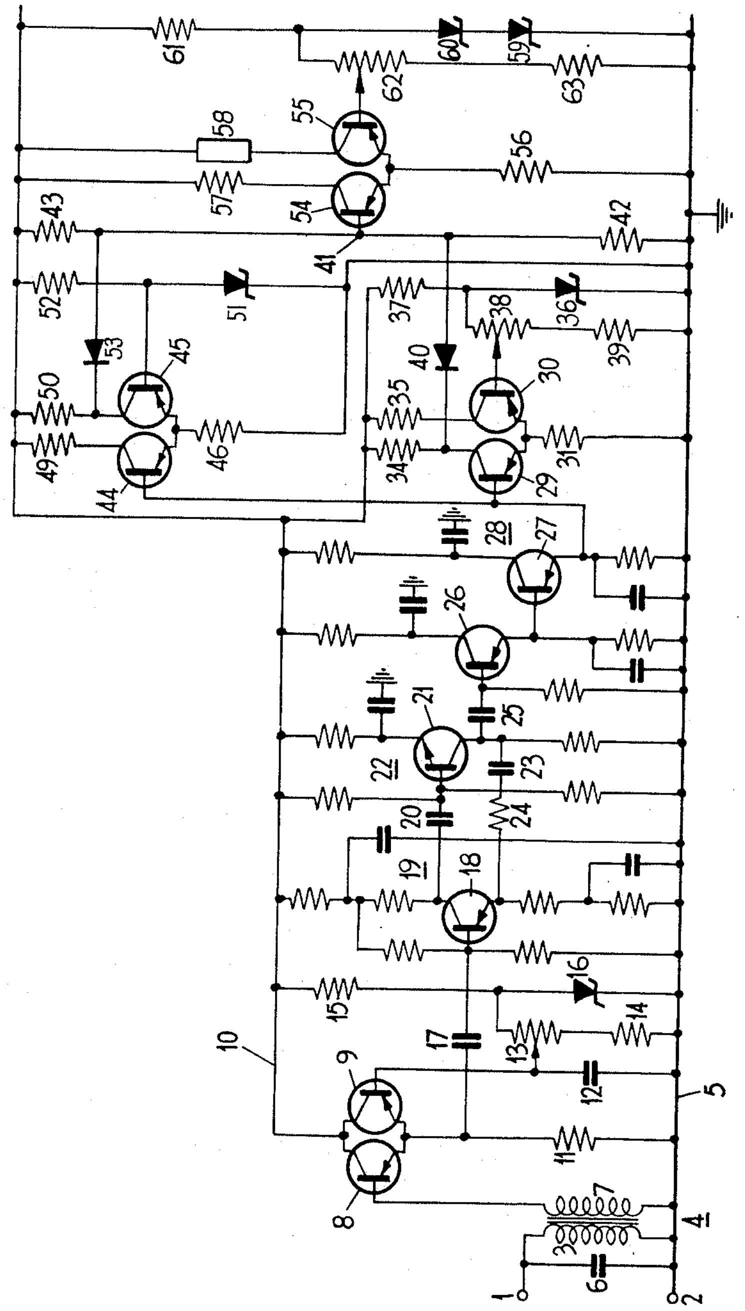
INVENTORS
BERNARD GARLAND
HANS KARL PFYFFER
BY Kinzlsten, Kinzlsten & Ottinger
ATTORNEYS 3,164,754
Patented Jan. 5, 1965

ELECTRIC CIRCUITS

Bernard Garland, near Coventry, and Hans Karl Pfyffer, Coventry, England, assignors to The General Electric Company Limited, London, England Filed Dec. 27, 1961, Ser. No. 162,394
Claims priority, application Great Britain, Dec. 29, 1960, 44,603/60
8 Claims. (Cl. 317—148.5)

This invention relates to electric circuits. More particularly, but not exclusively, the invention relates to electric circuits employing transistors and forming part of terminal equipment for use in a communication system of the kind in which a pilot signal is transmitted for the purpose of giving an indication of the transmission characteristics of a path between a transmitting terminal and a receiving terminal.

In one such system the receiving terminal (and each repeater) includes a regulator which regulates the level of the signal, including the pilot signal, passing through the terminal. On the output side of the regulator the pilot signal is filtered out and used to provide a control signal which is supplied to the regulator so as to cause the regulator to effect the required correction in the level of the signal which it passes.

In such a system, it is clearly necessary that the level of the pilot signal which is supplied to the path at the transmitting terminal should be accurately maintained, and also, if the level of the pilot signal which is being supplied to the path at the transmitting terminal should vary by more than a predetermined amount from its required level, that an indication should be given and/or a control effected.

One object of the present invention, therefore, is to provide an electric circuit which is arranged to give an indication and/or effect a control in the event of the level of an alternating current signal supplied thereto differing from a predetermined level by more than a prescribed amount.

According to the present invention, an electric circuit comprises a differencing network, means arranged to supply a direct current signal of substantially constant level to said network, means arranged to supply an input alternating current signal to said network whereby, during operation, said network supplies an output signal the instantaneous level of which is dependent upon the instantaneous difference in the levels of said direct and alternating current signals, means to rectify said output signal to provide a direct current output signal, and means to give an indication and/or effect a control if the level of the direct current output signal differs from a predetermined level by more than a prescribed amount.

Preferably said differencing network comprises first and second transistors, each having input, output and control electrodes, the output electrodes of the transistors being connected together and to a first point, and the input electrodes of the transistors being connected together and connected by way of a common impedance to a second point, and supply means arranged to maintain said points at suitable potentials whereby, during operation, when said direct current signal of substantially constant level is supplied to the control electrode of the second transistor and said input alternating current is supplied to the control electrode of the first transistor, said output signal, which is to be rectified to provide said direct current output signal, appears at the output electrodes of said transistors.

An electric circuit in accordance with the present invention will now be described by way of example with reference to the accompanying drawing which shows the circuit.

The circuit to be described may form part of equipment in a transmitting terminal of a communication system of the kind in which a pilot signal is transmitted for the purpose of giving an indication of the transmission characteristics of a path between a transmitting terminal and a receiving terminal. The circuit will, therefore, be described for the case in which it is used in such equipment, although it will be appreciated that this is not the only use to which the circuit can be put.

The transmitting terminal includes an oscillator which is arranged to generate the alternating current pilot signal, and the purpose of the circuit now to be described is to enable an indication to be given and/or a control to be effected if the level of the pilot signal, prior to transmission, differs from a predetermined level by more than a prescribed amount.

Referring now to the drawing, the circuit comprises input terminals 1 and 2 which are connected to the two ends respectively of the primary winding 3 of a transformer 4, the terminal 2 also being connected to an earth line 5. During operation, the pilot signal is supplied to the circuit between the terminals 1 and 2, a capacitor 6 being connected in parallel with the winding 3 of the transformer 4 to tune the winding 3 to the frequency of the pilot signal.

One end of the secondary winding 7 of the transformer 4 is connected to the earth line 5, whilst its other end is connected to the base eletcrode of a p-n-p junction transistor 8, having emitter, collector and base electrodes. The collector electrode of the transistor 8 is connected directly to the collector electrode of the similar junction transistor 9, and also to a negative supply line 10. The emitter electrode of the transistor 8 is directly connected to the emitter electrode of the transistor 9, and also to the earth line 5 by way of a resistor 11.

The base electrode of the transistor 9 is connected to the earth line 5 by way of a capacitor 12, and also to a variable tapping point on a potentiometer 13. One end of the potentiometer 13 is connected to the earth line 5 by way of a resistor 14, and the other end is connected to the supply line 10 by way of a resistor 15 and to the earth line 5 by way of a Zener diode 16.

The emitter electrodes of the transistors 8 and 9 are also connected by way of a capacitor 17 to the base electrode of a p-n-p junction transistor 18, having emitter, collector and base electrodes, the transistor 18 forming part of a first amplifier stage 19. The collector electrode of the transistor 18 is connected by way of a capacitor 20 to the base electrode of an n-p-n junction transistor 21, having emitter, collector and base electrodes, the transistor 21 forming part of a second amplifier stage 22.

Negative feedback is provided from the stage 22 to the stage 19, by way of a capacitor 23 and a resistor 24 connected in series between the collector electrode of the transistor 21 and the emitter electrode of the transistor 18, for the purpose of maintaining the gain substantially constant.

The collector electrode of the transistor 21 is connected by way of capacitor 25 to the base electrode of a p-n-p junction transistor 26, having emitter, collector and base electrodes, the transistor 26 being arranged to operate as a detector so as to supply a direct current output signal at its emitter electrode.

The emitter electrode of the transistor 26 is connected to the base electrode of a p-n-p junction transistor 27, having emitter, collector and base electrodes, the transistor 27 forming part of a buffer stage 28.

The emitter electrode of the transistor 27 is connected to the base electrode of a p-n-p junction transistor 29 having emitter, collector and base electrodes. The emitter electrode of the transistor 29 is directly connected to the emitter electrode of a similar transistor 30, and also by way of the resistor 31 to the earth line 5.

The collector electrode of the transistor 29 is connected to the supply line 10 by way of a resistor 34, whilst the collector electrode of the transistor 30 is connected to the supply line 10 by way of a resistor 35.

A substantially constant bias is supplied to the base electrode of the transistor 30 from a Zener diode 36 which is connected in series with a resistor 37 between the earth line 5 and the supply line 10. Connected in parallel with the Zener diode 36 is a potentiometer 38 in series with a resistor 39, the potentiometer 38 having a variable tapping point which is connected to the base electrode of the transistor 30.

The collector electrode of the transistor 29 is connected by way of a rectifier element 40 to a point 41, the point 41 being connected to the earth line 5 by way of a resistor 42 and to the supply line 10 by way of a resistor 43.

The emitter electrode of the transistor 27 is also connected to the base electrode of a transistor 44, similar to the transistor 29. The emitter electrode of the transistor 44 is directly connected to the emitter electrode of a similar transistor 45, and also by way of a resistor 46 to the earth line 5.

The collector electrode of the transistor 44 is connected to the supply line 10 by way of a resistor 49, whilst the collector electrode of the transistor 45 is connected to the supply line 10 by way of a resistor 50.

A substantially constant bias is supplied to the base electrode of the transistor 45 from a Zener diode 51 which is connected in series with a resistor 52 between the earth line 5 and the supply line 10. The junction of the Zener diode 51 and the resistor 52 is connected to the base electrode of the transistor 45.

The collector electrode of the transistor 45 is connected by way of a rectifier element 53 to the point 41.

The point 41 is connected to the base electrode of a p-n-p junction transistor 54 having emitter, collector and base electrodes. The emitter electrode of the transistor 54 is directly connected to the emitter electrode of a similar transistor 55, and also by way of a resistor 56 to the earth line 5. The collector electrode of the transistor 54 is connected to the supply line 10 by way of a resistor 57, whilst the collector electrode of the transistor 55 is connected by way of the winding of an electromagnetic relay 58 to the supply line 10.

A substantially constant bias is supplied to the base electrode of the transistor 55 from a pair of Zener diodes 59 and 60 which are connected in series with a resistor 61 between the earth line 5 and the supply line 10. Connected in parallel with the Zener diodes 59 and 60 is a potentiometer 62 in series with a resistor 63, the potentiometer 62 having a variable tapping point which is connected to the base electrode of the transistor 55.

The operation of the circuit will now be described making use of actual numerical values by way of illustration.

As previously mentioned, the alternating current pilot signal is supplied across the winding 3 of the transformer 4, and it is arranged that when the pilot signal has its required nominal level the peak amplitude of the signal supplied to the base electrode of the transistor 8 is 4.5 volts. Furthermore it is arranged that the supply line 10 is maintained at a stabilised negative potential of 20 volts, and that the Zener diode 16 and its associated circuitry give rise to a stabilised direct current bias of 4.0 volts at the base electrode of the transistor 9.

Assuming then that the pilot signal is at its nominal level, a small alternating current output signal having a peak amplitude of 0.5 volt is obtained at the emitter electrodes of the transistors 8 and 9. This alternating current output signal is amplified by the amplifier stage 19 and 22, and then detected by the transistor 26 and its associated circuitry, to provide a direct current output signal at the emitter electrode of the transistor 26. This direct current output signal has a level which is proportional to the peak amplitude of the alternating current output signal appearing at the emitter electrodes of the transistors 8 and 9.

The transistor 27, which presents a high impedance to the emitter electrode of the transistor 26, then supplies this direct current output signal, which is arranged to have a level of 5 volts when the pilot signal is at its nominal level, to the base electrodes of the transistors 29 and 44. The Zener diode 36 and its associated circuitry is arranged such that a direct current bias of 4.55 volts is supplied to the base electrode of the transistor 30, and the Zener diode 51 and its associated circuitry are arranged such that a direct current bias of 5.45 volts is supplied to the base electrode of the transistor 45.

If now the level of the pilot signal changes from its nominal level by more than 0.1 decibel, the peak amplitude of the alternating current signal supplied to the base electrode of the transistor 8 will vary by 0.045 volt, and this change will appear at the emitter electrodes of the transistors 8 and 9. It will be noted, however, that the change in the level of the signal at the emitter electrodes of the transistors 8 and 9 is thus 9%, whereas the change in the level of the signal supplied to the base electrode of the transistor 8 is only 1%.

Such a change will cause the level of the direct current output signal at the emitter electrode of the transistor 27 to change by 0.45 volt; this being the amount by which the bias on the base electrodes of the transistors 30 and 45 differ from the bias applied to the base electrodes of the transistors 29 and 44 when the pilot signal has its nominal level.

If then it is assumed that the transistor 44 is non-conducting, transistor 45 is conducting, and that the level of the pilot signal increases by more than 1%, then the bias applied tot he base electrode of the transistor 44 will increase by more than 0.45 volt and the transistor 44 will conduct, the transistor 45 becoming non-conducting. The rectifier element 53 is arranged such that when this occurs a current flows through resistor 42, rectifier element 53 and resistor 50, so developing a voltage across the resistor 42 such that the transistor 54, which was previously non-conducting, conducts, and the transistor 55, which was previously conducting, becomes non-conducting. This causes the winding of the relay 58 to be de-energised, and it is arranged that this causes an indication to be given and/or a control to be effected.

Such a change does not affect the transistors 29 and 30.

If, on the other hand, the level of the pilot signal falls by more than 1%, the transistor 29, which was previously conducting, becomes non-conducting, and the transistor 30 which was also previously non-conducting, conducts. In a similar way to that previously described, therefore, a current flows through the resistor 42, the rectifier element 40 and the resistor 34, causing the transistor 54 to conduct and the winding of the relay 58 to be de-energised.

In this case the transistors 44 and 45 are not affected.

It will thus be seen that the circuit operates in such a way that the relay 58 is de-energised in the event of the pilot signal differing by more than 1% from its nominal level in either sense. The circuit arrangement is also such that in the event of the supply to the supply line 10 failing, the winding of the relay 58 is de-energised.

We claim:

1. An electric circuit comprising a differencing network, means arranged to supply a direct current signal of substantially constant level to said network, means arranged to supply an alternating current input signal to said network whereby, during operation, said network supplies an alternating current output signal the amplitude of which is dependent upon the amount by which the peak value of the alternating current input signal exceeds the value of the direct current signal, means to rectify said alternating current output signal to provide a direct current output signal, and means to give an indication and/or effect a control if the level of the direct current output signal differs from a predetermined level by more than a prescribed amount.

2. A circuit in accordance with claim 1 wherein said differencing network comprises first and second transistors, each having input, output and control electrodes, the output electrodes of the transistors being connected together and to a first point, and the input electrodes of the transistors being connected together and connected by way of a common impedance to a second point, and supply means arranged to maintain said points at suitable potentials whereby, during operation, when said direct current signal of substantially constant level is supplied to the control electrode of the second transistor and said alternating current input signal is supplied to the control electrode of the first transistor, said output signal, which is to be rectified to provide said direct current output signal, appears at the input electrodes of said transistors.

3. A circuit in accordance with claim 2 wherein the first and second transistors are junction transistors, each having emitter, collector and base electrodes.

4. Terminal equipment for use in a communication system of the kind in which a pilot signal is transmitted for the purpose of giving an indication of the transmission characteristics of a path between a transmitting terminal and a receiving terminal, including a circuit in accordance with claim 1 wherein said pilot signal forms said input alternating current signal.

5. An electric circuit comprising a differencing network, means to supply a direct current signal of substantially constant value to said network, means to supply an alternating current input signal to said network whereby, during operation, said network supplies an alternating current output signal the amplitude of which is dependent upon the amount by which the peak value of the alternating current input signal exceeds the value of the direct current signal, means to rectify said alternating current output signal to provide a direct current output signal, a low level detection circuit and a high level detection circuit which are respectively formed by first and second similar two-condition circuits each of which includes first and second junction transistors each having emitter, collector and base electrodes, the two conditions of each of the two-condition circuits being a first condition in which the collector-emitter path of the first transistor is conducting and the collector-emitter path of the second transistor is non-conducting, and a second condition in which the collector-emitter path of the first transistor is non-conducting and the collector-emitter path of the second transistor is conducting, and means to supply a bias to the base electrodes of the first transistors in the two-condition circuit in dependence upon the level of said direct current output signal, the arrangement being such that the first two-condition circuit is in its first condition and the second two-condition circuit is in its second condition when the direct current output signal has a predetermined level, the first two-condition circuit changes to its second condition if the level of the direct current output signal falls below said predetermined level by more than a prescribed amount, and the second two-condition circuit changes to its first condition if the level of the direct current output signal rises above said predetermined level by more than said prescribed amount.

6. A circuit in accordance with claim 5 which also comprises a third two-condition circuit including first and second transistors each having emitter, collector and base electrodes, the two conditions of the third two-condition circuit being a first condition in which the collector-emitter path of the first transistor is conducting and the collector-emitter path of the second transistor is non-conducting, and a second condition in which the collector-emitter path of the first transistor is non-conducting and the collector-emitter path of the second transistor is conducting, and mean to apply a bias to the base electrode of the second transistor in the third two-condition circuit in dependence upon the conditions of the first and second two-condition circuits, the arrangement being such that the third two-condition circuit is normally in its first condition but changes to its second condition if the first two-condition circuit changes to its second condition or the second two-condition circuit changes to its first condition.

7. A circuit in accordance with claim 6 wherein the operating winding of an electromagnetic relay is connected in series with the collector-emitter path of the first transistor in the third two-condition circuit, said winding being de-energised and said relay operating to give said indication and/or effect said control when the third two-condition circuit is in its second condition.

8. Terminal equipment for use in a communication system of the kind in which a pilot signal is transmitted for the purpose of giving an indication of the transmission characteristics of a path between a transmitting terminal and a receiving terminal, including a circuit in accordance with claim 5 wherein said pilot signal forms said input alternating current signal.

References Cited by the Examiner

UNITED STATES PATENTS

| | | | |
|---|---|---|---|
| 2,864,000 | 12/58 | Elson | 328—146 |
| 2,882,522 | 4/59 | Pearlman | 328—148 X |
| 2,965,889 | 12/60 | Cook et al. | |
| 3,120,663 | 2/64 | Beaman et al. | 307—88.5 |
| 3,138,763 | 6/64 | Hendrickson | 328—150 |

SAMUEL BERNSTEIN, *Primary Examiner.*